United States Patent
Recker

[11] Patent Number: 5,078,059
[45] Date of Patent: Jan. 7, 1992

[54] HAY BALE VENTILATOR

[76] Inventor: Florian B. Recker, 802 1st St., SW., Dyersville, Iowa 52040

[21] Appl. No.: 543,391

[22] Filed: Jun. 26, 1990

[51] Int. Cl.$^5$ .............................................. B30B 9/00
[52] U.S. Cl. ................................. 100/98 A; 100/179; 100/295
[58] Field of Search .............. 100/98 A, 179, 188 R, 100/190, 295; 56/341

[56] References Cited

U.S. PATENT DOCUMENTS

| | | | |
|---|---|---|---|
| 253,536 | 2/1882 | Lord | 100/98 A X |
| 817,984 | 4/1906 | North et al. | 100/98 A |
| 960,796 | 6/1910 | Bishop | 100/98 A |
| 970,930 | 9/1910 | Kingham | 100/98 A |
| 2,420,923 | 5/1947 | West | 100/98 A |
| 2,654,308 | 10/1953 | Millard et al. | 100/98 A X |
| 2,737,108 | 3/1956 | Galick | 100/98 A |
| 2,804,820 | 9/1957 | Mattson | 100/98 A |
| 2,933,037 | 4/1960 | Russell | 100/98 A |
| 3,022,723 | 2/1962 | Templeton | 100/98 A |

FOREIGN PATENT DOCUMENTS

| | | | |
|---|---|---|---|
| 2450012 | 5/1976 | Fed. Rep. of Germany | 100/98 A |
| 753883 | 8/1956 | United Kingdom | 100/98 A |
| 2063150 | 6/1981 | United Kingdom | 100/98 A |

*Primary Examiner*—Harvey C. Hornsby
*Assistant Examiner*—Stephen F. Gerrity
*Attorney, Agent, or Firm*—Fleit, Jacobson, Cohn, Price, Holman & Stern

[57] ABSTRACT

A hay bale ventilator in the form of a support plate having a tapered pointed member extending therefrom with the plate being mounted on the plunger of the hay baler and the pointed member forming a hole or passageway through each segment of the hay bale as it is formed. The pointed member is of two-piece construction having a wear-resistant pointed tip removably mounted on a larger cylindrical member connected with the plate with the pointed member and the cylindrical member having different angles of taper to assure that a hole or passageway will be formed without the hay sticking to the pointed member as it reciprocates with the plunger on the baler.

4 Claims, 1 Drawing Sheet

HAY BALE VENTILATOR

BACKGROUND OF THE INVENTION

1. Field of Invention

The present invention generally relates to the baling of hay or similar material and more specifically to a hay bale ventilator in the form of an attachment for the plunger of a hay baler to progressively form a central bore or passageway through the hay bale as it is formed by the hay baler thereby reducing the tendency of hay bales to mold in the center thereof due to the moisture content of the material being baled.

The hay bale ventilator is in the form of a support plate having a tapered pointed member extending therefrom with the plate being mounted on the plunger of the hay baler and the pointed member forming a hole or passageway through each segment of the hay bale as it is formed. The pointed member is of 2-piece construction having a wear-resistant pointed tip removably mounted on a larger cylindrical member connected with the plate with the pointed member and the cylindrical member having different angles of taper to assure that a hole or passageway will be formed without the hay sticking to the pointed member as it reciprocates with the plunger on the baler.

2. DESCRIPTION OF THE PRIOR ART

Attachments for hay baler plungers to form a bore or passageway in a hay bale are generally known as disclosed in the following U.S. Pat. Nos.

253,536
960,796
2,420,923
2,654,308
2,804,820
2,933,037
3,022,723

While the above patents disclose the basic concept of forming a ventilating bore or passageway, they do not disclose the specific structure of the hay bale ventilator of this invention including the multiple piece construction, the dual taper and the manner of assembling the components when mounting the ventilator on the plunger of the hay baler. None of the above devices were accepted as a satisfactory method of eliminating mold in a bale of hay. Some of them were manufactured, advertised and offered for sale. However, farmers did not accept them as they didn't perform satisfactorily as they didn't make a hole and in some instances the bales curled into the shape of a banana.

SUMMARY OF THE INVENTION

An object of the present invention is to provide a hay bale ventilator adapted to be attached to the reciprocating plunger of a conventional hay baler to progressively form a longitudinal bore or passageway centrally in a hay bale being formed by the baler thereby providing a continuous bore or passageway of a relatively large cross-sectional area to facilitate air movement through the center of a hay bale to reduce the tendency of mold forming in the center of the hay bale due to the moisture content of the hay used in forming the bale.

Another object of the invention is to provide a hay bale ventilator including a mounting plate and a pointed member extending perpendicular and rearwardly therefrom with a pointed member being of 2-piece construction with a removable, tapered, wear-resistant pointed tip or spear and a hollow cylindrical member having a tapered rear end with the taper of the tip being at an angle less than the angle of taper of the rear end of the cylindrical member.

A further object of the invention is to provide a hay bale ventilator in accordance with the proceeding objects in which a bolt with a screw threaded rear end is provided between the base plate and the tip end of the pointed member and the front end of the cylindrical member telescopes over a flange on the base plate and a lock structure is provided between the tip and the bolt to prevent relative rotation therebetween thereby retaining the components of the hay bale ventilator in secure assembled relation on the plunger of the hay baler.

Still another object of the invention is to provide a hay bale ventilator which is simple in construction, long lasting, trouble free in operation and easy to assemble on the plunger of a hay baler with the device operating efficiently to form a ventilating bore or passageway in a hay bale as it is being formed by the hay baler.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
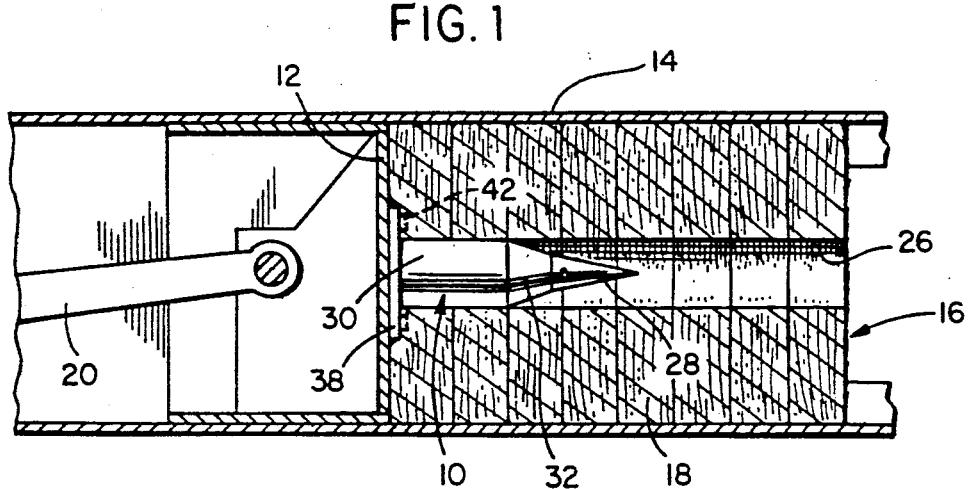
FIG. 1 is a schematic elevational view of a hay baler structure with the ventilator of the present invention mounted thereon illustrating the manner in which a central longitudinal bore or passageway is formed in the hay bale.
Figure 2:
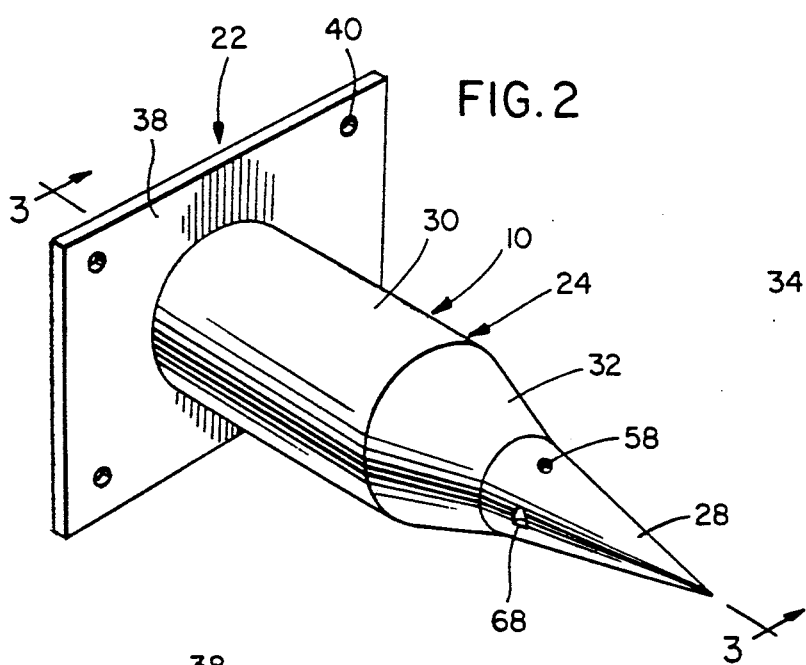
FIG. 2 is a perspective view of the hay bale ventilator.
Figure 4:
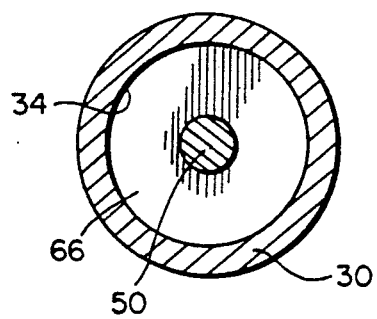
FIG. 4 is a transverse, sectional view taken substantially upon a plane passing along section line 4—4 on FIG. 3 illustrating further structural details of the hay bale ventilator.

Referring now specifically to the drawings, the hay bale ventilator of the present invention is generally designated by reference numeral 10 and is mounted on a plunger 12 which reciprocates in a compression chamber 14 of a hay baler as schematically illustrated in FIG. 1. The structure of the hay baler is conventional and forms a hay bale 16 by compressing segments of hay or other material 18 progressively as the hay is fed into the compression chamber in the path of the plunger 12 as the plunger 12 is reciprocated by an actuating mechanism schematically illustrated as a connecting rod 20 which reciprocates the plunger 12 in a conventional manner.

The hay bale ventilator 10 includes a base plate generally designated by reference numeral 22 and a pointed member generally designated by numeral 24 which is connected to the base plate 22 and extends generally longitudinally in the compression chamber 14 generally at the center thereof to form a continuous longitudinal bore or passageway 26 in the hay bale 16 as it is formed to enable circulation of air through the center of the hay bale to reduce the tendency of the center of the hay bale to mold due to the moisture content of the hay being formed into the hay bale.

Figure 3:
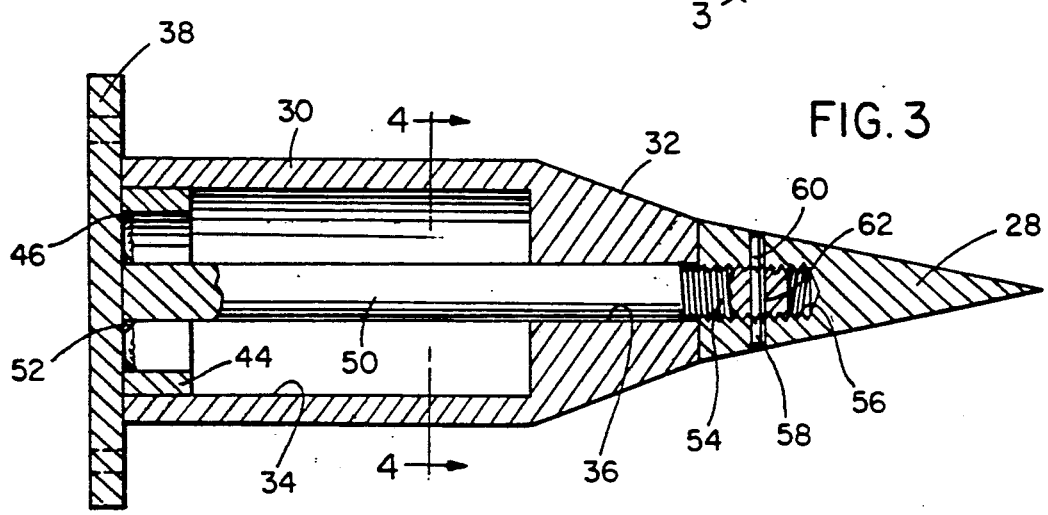
FIG. 3 is a longitudinal, sectional view taken substantially upon a plane passing along section line 3—3 on FIG. 2 illustrating specific structural details of the hay bale ventilator.

The pointed member 24 extends rearwardly from the plunger and base plate and includes a tapered tip or spear 28 of solid metal construction and a cylindrical member 30 having a tapered rear end 32 which is engaged by the larger front end of the tapered tip 28 as illustrated in FIG. 3. The interior of the cylindrical member 32 is hollow as indicated by reference numeral 34 and the tapered end 32 is substantially solid and provided with a longitudinal bore 36 extending therethrough.

The base plate 22 is a generally square or rectangular solid metal plate 38 having corner apertures 40 therein receiving fastening devices 42 to secure the plate 38 to the plunger 12. Centrally of the plate 38, a cylindrical flange 44 is welded thereto as at 46 with the flange 44 telescoping into the hollow interior 34 of the cylindrical member 30 to anchor the cylindrical member 30 in the center of the base plate 38.

Also welded to the center of the plate 38 is an elongated bolt 50 as by welding 52. The rear end of the bolt 50 is provided with external screw threads 54 for screw threaded engagement with an internally threaded bore 56 in the large front end of the tip 28 of the pointed member. A roll pin 58 extends transversely through a bore 60 in the tapered surface of the tip 28 and through a passageway 62 in the bolt 50 thereby preventing relative rotation between the bolt 50 and the tip 28 to keep the components of the pointed member 24 assembled and to permit disassembly. Also, the tip 28 is provided with tangential recesses 68 to receive an impact tool such as a punch or the like or a spanner wrench to enable the tip 28 to be screw threaded in relation to the bolt 50. This specific structure is disclosed in my prior U.S. Pat. No. 3,849,007 issued Nov. 19, 1974.

While dimensional characteristics of the device may vary to some extent, preferably, the pointed member 24 includes an overall length of 10" with the cylindrical member 30 being 6" in length with the cylindrical portion thereof being 4" in length and the tapered end 32 being 2" in length and tapered inwardly at an angle of 19° in relation to the longitudinal axis of the pointed member. The tip 28 is 4" in length and tapers at a 10° angle in relation to the longitudinal axis of the pointed member. The threaded bore 56 in the tip is 1¼" in length and the threaded end of the bolt is at least 1" in length. The cylindrical member has an outside diameter of 3" and the plate may be 5" in one dimension and 7" in the other or the plate may be a 4" square plate. After the base plate 38, the cylindrical member 30 and the tip or spear 28 are assembled with the tip securely screwed onto bolt 50, a ⅛" bore 60 in the tip 28 and passageway 62 in bolt 50 are drilled to receive a ⅛" by 1¼" roll pin which securely but releaseably retains the tip screwed onto the bolt.

The construction of the ventilator enables the tip or spear 28 to be constructed of heat treated, high grade steel which will resist wear while the cylindrical member may be constructed of lighter weight and less expensive aluminum. The bolt is welded to the center of the base plate which is also constructed of steel and the roll pin provide a secure connection between the components but yet enables the components to be separated for replacement in the event of wear.

If desired, the flange 44 which is of steel construction, may be welded directly to the baler plunger 12 thereby eliminating the need for a base plate 22 thereby further reducing the cost and weight of the ventilator. With this arrangement, a longer bolt with threads on both ends can pass through the plunger and thread into the tip or spear with a castellated nut on the end of the bolt which extends through the plunger. The flange welded to the plunger will reinforce the plunger and, if desired, additional reinforcement may be provided for the plunger.

Another attachment procedure may be the provision of a hole in the plunger the size of the cylindrical member 30 which passes through the plunger. A large steel plate is welded to the front surface of the plunger opposite to that which engages the hay with a bolt having threads on both ends engaged with the tip or spear and passing through the cylindrical member, the hole in the plunger and the hole in the plate with a castellated nut on the front end of the bolt to retain the bolt in assembled relation on the plunger with the cylindrical end of the cylindrical member being received and telescoped into the correspondingly sized hole formed in the plunger.

With the ventilator of the present invention attached to the plunger of the hay baler, the hay baler will operate in a normal manner with the ventilator forming a bore or passageway through each increment or segment of the hay bale as it is being compressed thereby forming a continuous bore or passageway through the completed hay bale in order to enable air to pass therethrough after the hay bale has been discharged from the hay baler and while it rests on the ground and after it has been collected and stored with the ends thereof exposed.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hay bale ventilator adapted to be attached to a reciprocating plunger of a hay baler, said ventilator comprising a pointed member and means mounting the pointed member on a plunger of a hay baler, said pointed member comprising a tapered tip constructed of wear resistant material and a cylindrical portion of hollow construction of generally equal length, said tapered tip including an outer pointed end and a larger inner end having an internally threaded socket therein, said tapered tip including a continuous, smooth outer surface symmetrical about a longitudinal axis and devoid of projections, said means mounting the pointed member on the plunger comprising a threaded member on the cylindrical portion of the pointed member threaded into the internally threaded socket in the inner end of the tip, a base plate rigid with respect to the cylindrical portion and having apertures for receiving fasteners to secure the base plate to the plunger.

2. The structure as defined in claim 1 wherein said tip and threaded member include a removeable roll pin extending transversely therethrough to prevent relative rotation between these components.

3. The structure as defined in claim 2 wherein said pointed member includes a length of approximately 10", said tip being constructed of heat treated, wear resistant steel and said cylindrical portion of the pointed member is constructed of light weight aluminum.

4. The structure defining claim 1 wherein the cylindrical portion of said pointed member includes a tapered outer end in abutting contact with the inner end of said tip with the outer surface of the tapered outer end of the cylindrical portion forming a smooth transition with the outer surface of the tip, the angle of taper of the tip being less than the angle of taper of the outer end of the cylindrical portion, said threaded member being in the form of a bolt extending longitudinally through the cylindrical portion and the tapered end thereof and including an inner end rigidly affixed to the base plate, said base plate including a flange rigidly mounted thereon and in telescopic relation to the inner end of the cylindrical portion to anchor the cylindrical portion of the pointed member to the base plate when the tip is screwed onto the threaded bolt thereby clamping the cylindrical portion against the base plate.

* * * * *